United States Patent
Tang et al.

(10) Patent No.: US 9,389,835 B2
(45) Date of Patent: Jul. 12, 2016

(54) FINITE FIELD INVERTER

(71) Applicant: SOUTH CHINA UNIVERSITY OF TECHNOLOGY, Guangzhou, Guangdong (CN)

(72) Inventors: Shaohua Tang, Guangzhou (CN); Haibo Yi, Guangzhou (CN)

(73) Assignee: South China University of Technology, Guangzhou, Guangdong (CN)

(*) Notice: Subject to any disclaimer, the term of this patent is extended or adjusted under 35 U.S.C. 154(b) by 401 days.

(21) Appl. No.: 14/236,336

(22) PCT Filed: Dec. 5, 2012

(86) PCT No.: PCT/CN2012/085948
§ 371 (c)(1),
(2) Date: Jan. 31, 2014

(87) PCT Pub. No.: WO2014/026451
PCT Pub. Date: Feb. 20, 2014

(65) Prior Publication Data
US 2015/0067011 A1 Mar. 5, 2015

(30) Foreign Application Priority Data
Aug. 3, 2012 (CN) .............................. 2012 0 275733

(51) Int. Cl.
G06F 7/00 (2006.01)
G06F 7/72 (2006.01)

(52) U.S. Cl.
CPC ...................................... G06F 7/726 (2013.01)

(58) Field of Classification Search
CPC ........................................................ G06F 7/726
USPC ................................................. 708/491–492
See application file for complete search history.

(56) References Cited

U.S. PATENT DOCUMENTS 4,975,867 A 12/1990 Weng
6,138,133 A 10/2000 Oh
(Continued)

FOREIGN PATENT DOCUMENTS

CN 1032595 A 4/1989
CN 101572602 A 11/2009

OTHER PUBLICATIONS

Extended European Search Report, Application No. EP12879153.0. Date of mailing: Mar. 3, 2015. European Patent Office, Munich, Germany.
(Continued)

*Primary Examiner* — Tan V. Mai
(74) *Attorney, Agent, or Firm* — Coats & Bennett, P.L.L.C.

(57) ABSTRACT

A finite field inverter is disclosed, wherein the finite field inverter includes an input port, an output port and a search tree inverse circuit configured to perform an inverse operation of the operand a(x) in the finite field $GF(2^n)$ based on a search tree structure. The search tree inverse circuit is provided with a left search tree and a right search tree. The left search tree and the right search tree each includes tree nodes for processing inverse operations over the finite field $GF(2^n)$ and connecting wires connected between the tree nodes. The tree nodes include a root node, internal nodes and leaf nodes. Each path from the root node to a leaf node represents an element in the finite field $GF(2^n)$. The connecting wires between the tree nodes connect the path representing the operand a(x) with the path representing the inversion result b(x). The present invention uses a search tree inverse circuit to achieve an inverse operation of an element in a finite field, and compared with the existing finite field inverter, the present invention is more efficient in processing inverse operations over the finite field $GF(2^n)$.

6 Claims, 3 Drawing Sheets

(56) References Cited

U.S. PATENT DOCUMENTS

| | | | |
|---|---|---|---|
| 6,779,011 B2 | 8/2004 | Weng et al. | |
| 6,862,354 B1* | 3/2005 | McGrew | H04L 9/065 380/37 |
| 2003/0198343 A1* | 10/2003 | Morioka | H04L 9/0618 380/37 |
| 2003/0219118 A1 | 11/2003 | Beverly | |
| 2004/0107341 A1* | 6/2004 | Hall | H04L 9/0836 713/161 |
| 2010/0306299 A1 | 12/2010 | Reidenbach | |
| 2013/0173917 A1* | 7/2013 | Clifton | G06F 21/6227 713/167 |

OTHER PUBLICATIONS

International Search Report and Written Opinion, English translation of, International application No. PCT/CN2012/085948. Date of mailing: May 16, 2013. SIPO, Beijing, China.

Guo, J-H. et al., "Systolic Array Implementation of Euclid's Algorithm for Inversion and Division in GF(2m)." IEEE Transactions on Computers, vol. 47, No. 10, pp. 1161-1167, Oct. 1988.

Sarkar, P., et al., "A Parallel Algorithm for Computing Simultaneous Inversions with Application to Elliptic Curve Scalar Multiplication." IEEE Midwest Symposium on Circuits and Systems, vol. 2, pp. 782-785, Dec. 2003.

\* cited by examiner

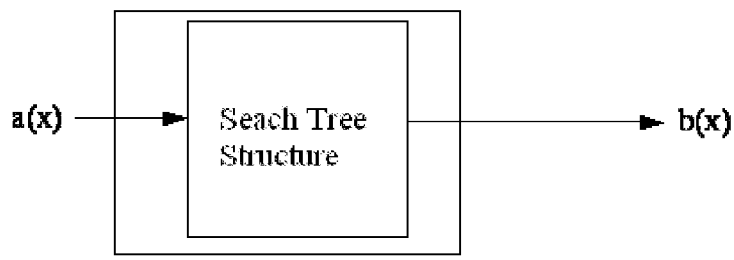
Figure 1
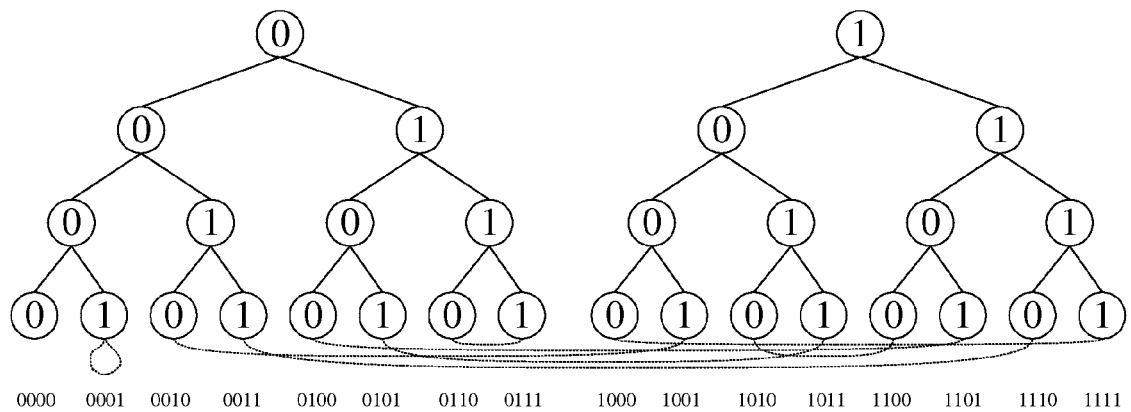
Figure 2
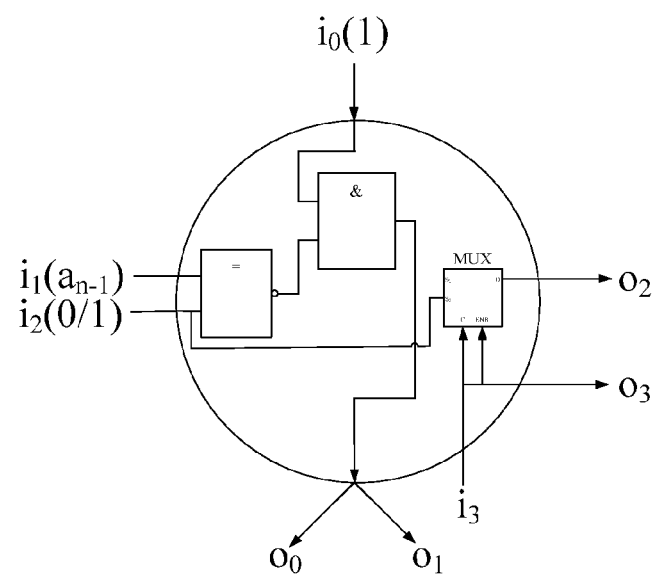
Figure 3 (1)

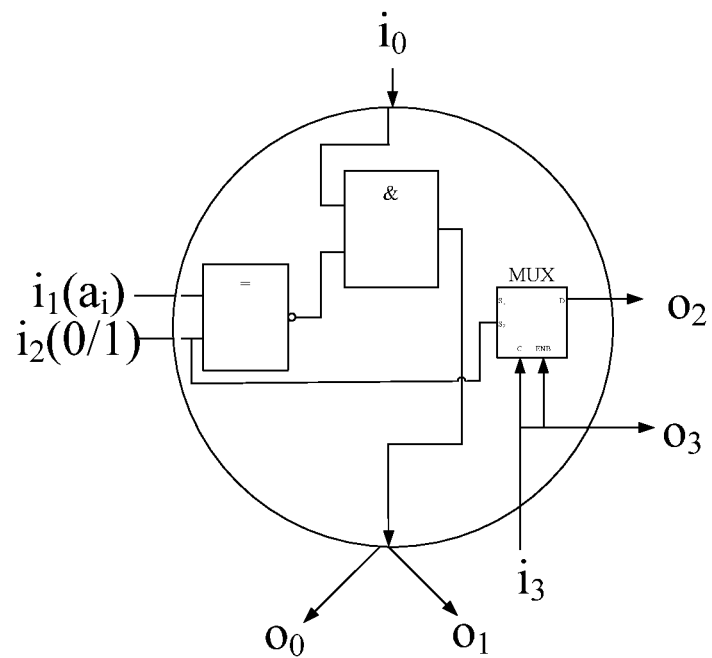
Figure 3 (2)
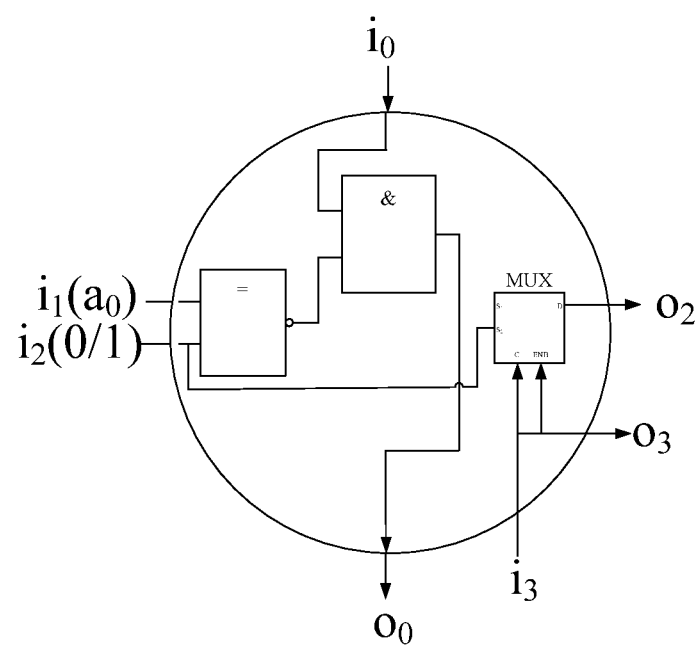
Figure 3 (3)

FINITE FIELD INVERTER

FIELD OF THE INVENTION

The present invention relates generally to the field of an apparatus for calculating an inverse of an element in a finite field.

BACKGROUND OF THE INVENTION

A finite field is a field that contains a finite number of elements, which is widely used in various engineering fields. The finite field inverse operations can be roughly divided into four types: an inversion based on Fermat's Theorem, an inversion based on Extended Euclid's Algorithm, an inversion based on Montgomery Algorithm and an inversion based on look-up table technique.

All kinds of finite field operations can be effectively applied in various cryptographic applications and coding techniques. The designing of an effective finite field inverse operation plays a key role in cryptosystem implementation. Many well-known finite field inverters in the prior art, including software inverters and hardware inverters, have some shortcomings, for example, the performance cannot reach the requirement of high-speed, small-area and low-power consumption.

SUMMARY OF THE INVENTION

In order to overcome the deficiencies of the prior art, the object of the present invention is to provide a finite field inverter, which uses a search tree structure to calculate an inverse of an element in a finite field; the present invention is more efficient when compared with the existing finite field inverter, and it has the characteristics of high-speed, small-area and low-power consumption in inverse operation over finite field $GF(2^n)$.

The object of the present invention is achieved by the following technical solutions:

A finite field inverter includes:

an input port, configured to input an operand $a(x)$;

a search tree inverse circuit, configured to perform an inverse operation of an operand $a(x)$ in the finite field $GF(2^n)$ based on a search tree structure; and an output port, configured to output an inversion result $b(x)$ of the operand $a(x)$.

The search tree inverse circuit is provided with a left search tree and a right search tree. The left search tree and the right search tree both include tree nodes for processing inverse operations over the finite field $GF(2^n)$ and connecting wires between the tree nodes. The tree nodes include a root node, internal nodes and leaf nodes. Each path from the root node to a leaf node represents an element in the finite field $GF(2^n)$. The connecting wires between the tree nodes connect the path representing the operand $a(x)$ with the path representing the inversion result $b(x)$.

In the search tree inverse circuit, the operand $a(x)$ is represented by a path from the root node to a leaf node $n_1$, the inversion result $b(x)$ is represented by a path from the root node to a leaf node $n_2$, and the connecting wire is provided between the leaf node $n_1$ and the leaf node $n_2$.

In the search tree inverse circuit, the tree nodes include a NXOR logic gate, a AND logic gate and a data selector MUX. One input of the NXOR logic gate is the bit value of the operand $a(x)$, and the other input is $i_2$. One input of the AND logic gate is $i_0$, and the other input is the output of the NXOR logic gate. The data selector MUX is provided with a data input $i_2$, a gated input $i_3$ from its child node, a inverse output $o_2$ and a output $o_3$ transmitted to its parent node. If the tree node is a root node, $i_0$ is 1; if the tree node is an internal node or a leaf node, and at the same time also a left child node, $i_2=0$; if the tree node is an internal node or a leaf node, and at the same time also a right child node, $i_2=1$; if the tree node is a root node or an internal node, the AND logic gate outputs the result of Boolean AND operator to its child node; if the tree node is a leaf node, the AND logic gate outputs the result of Boolean AND operator to a leaf node connected thereto; for the root node of the left search tree, $i_2=0$, and for the root node of the right search tree, $i_2=1$.

The operand $a(x)$ and the inversion result $b(x)$ have the following forms:

$$a(x)=a_{n-1}x^{n-1}+a_{n-2}x^{n-2}+\ldots+a_0;$$

$$b(x)=b_{n-1}x^{n-1}+b_{n-2}x^{n-2}+\ldots+b_0.$$

Compared with the prior art, the present invention has the following advantages and technical effects:

The present invention achieves finite field inverse operations by a structure of search tree; compared with the existing finite field inverter, the present invention has advantages of high-speed, small-area and low-power consumption in a finite field $GF(2^n)$ inverse operation, and therefore, it can be applied to various engineering fields, particularly to the hardware implementation of cryptographic algorithms and to the solving of various mathematical problems.

BRIEF DESCRIPTION OF THE DRAWINGS

FIG. 1 is a structure schematic diagram of a finite field inverter according to an embodiment of the present invention.

FIG. 2 is a structure schematic diagram of a search tree inverse circuit according to an embodiment of the present invention.

FIG. 3 is a structure schematic diagram of various tree nodes according to an embodiment of the present invention.

DETAILED DESCRIPTION OF THE PREFERRED EMBODIMENTS

Figure 4:
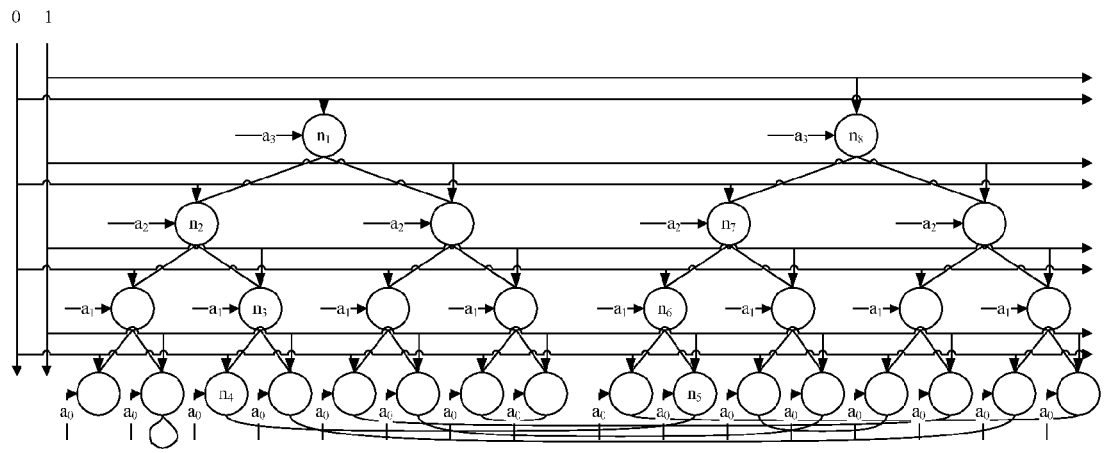
FIG. 4 is a structure schematic diagram of a search tree inverse circuit for searching a finite field element to be inversed according to an embodiment of the present invention.

Further characteristics and advantages of the present invention will be apparent upon reading the following description provided by way of non-limiting examples, with reference to the attached drawings.

EXAMPLES

As shown in FIG. 1, a finite field inverter of the present invention includes an input port, an output port and a search tree inverse circuit.

The following paragraphs will describe in detail the components of the inverter according to the present invention.

1. Input port: as shown in FIG. 1, the input port of the inverter of the present invention is used for inputting a operand $a(x)$.

$a(x)$ can be expressed as the following form:

$$a(x)=a_{n-1}x^{n-1}+a_{n-2}x^{n-2}+\ldots+a_0$$

wherein $a_{n-1}, a_{n-2}, \ldots, a_0$ are elements in GF(2).

2. Output port: as shown in FIG. 1, the output port of the inverter of the present invention is used for outputting an inverse b(x) of the finite field element a(x).

b(x) can be expressed as the following form:

$$b(x) = b_{n-1}x^{n-1} + b_{n-2}x^{n-2} + \ldots + b_0$$

wherein $b_{n-1}, n_{n-2}, \ldots, b_0$ are elements in GF(2).

3. Search tree inverse circuit: as a main component of the inverter, the search tree inverse circuit is a core component of the present invention, and it includes a plurality of tree nodes and connecting wires connected between the tree nodes.

As shown in FIG. 2, each tree node has, other than leaf nodes, a left child node and a right child node; the value of the left child node is 0, and the value of the right node is 1. Each path from the root node to a leaf node represents an element in the finite field $GF(2^n)$. If an element a(x) in the finite field $GF(2^n)$ is represented by a path from the root node to a leaf node $n_1$, and the inverse of a(x) is represented by a path from the root node to a leaf node $n_2$, there will be a connecting wire connected between the leaf node $n_1$ and the leaf node $n_2$.

As shown in FIG. 3, the tree nodes of the search tree structure include three kinds of tree nodes, namely: root node, internal node and leaf node, respectively shown in FIG. 3 (1), FIG. 3 (2) and FIG. 3 (3). The internal circuit of these three kinds of tree nodes are the same, each of them includes two logic gates, i.e. a NXOR logic gate and a AND logic gate, and a data selector MUX.

$i_1$ and $i_2$ are two inputs of NXOR, $i_1=a_i$, $i_2=0/1$; one input $i_0$ of AND is from an output of its parent node, and the other input of AND is from an output of NXOR; $o_1=o_2$, $o_1$ and $o_2$ are outputs of AND, they are directly outputted to the left and right child nodes of the node. If the tree node is a left child node, the two inputs of NXOR are $a_i$ and 0; otherwise, the two inputs of NXOR are $a_i$ and 1. As shown in FIG. 3, it has the following logical representation: $o_0 = (NOT(i_1 \text{ XOR } i_2)) \text{ AND } i_0$, $o_1 = (NOT(i_1 \text{ XOR } i_2)) \text{ AND } i_0$.

The differences between the three kinds of tree nodes are input and output ports. For example, in the root node, $i_0=1$, $i_1=a_{n-1}$, $i_2=0/1$, wherein $a_{n-1}$ is the value of the $(n-1)^{th}$ bit of the finite field element a(x), the NXOR logic gate carries out logic operation on the value $a_{n-1}$ of the $(n-1)^{th}$ bit of a(x) and the other input $i_2$, and then outputs the arithmetic result to one input port of the AND logic gate, the AND logic gate carries out logical AND operation on the arithmetic result and 1, and then outputs the logical AND operation result respectively to the left child node and the right child node of the root node; in the internal nodes, $i_1=a_i$, $i_2=0/1$, wherein $a_i$ is the value of the $i^{th}$ bit of the finite field element a(x), the NXOR logic gate carries out logic operation on the value $a_i$ of the $i^{th}$ bit of a(x) and the other input $i_2$, and then outputs the arithmetic result to one input port of the AND logic gate, the AND logic gate carries out logical AND operation on the arithmetic result and the output $i_0$ from the parent node of the internal node, and then outputs the logical AND operation result respectively to the left child node and the right child node of the internal node; in the leaf node, $i_1=a_0$, $i_2=0/1$, wherein $a_0$ is the value of the $0^{th}$ bit of the finite field element a(x), the NXOR logic gate carries out logic operation on the value $a_0$ of the $0^{th}$ bit of a(x) and the other input $i_2$, and then outputs the arithmetic result to one input port of the AND logic gate, the AND logic gate carries out logical AND operation on the arithmetic result and the output $i_0$ from the parent node of the leaf node, and then outputs the logical AND operation result to the leaf nodes connected to the said leaf node. If the tree node is a left child node, $i_2=0$; and if the tree node is a right child node, $i_2=1$. The present invention includes two search trees, that is, a left search tree and a right search tree, for the root node of the left search tree, $i_2=0$, while for the root node of the right search tree, $i_2=1$.

The data selector MUX is defined as follows: $i_2$ is a data input and $i_3$ is a strobe input which comes from the input of the child node of the node; $o_2$ and $o_3$ are outputs, $o_2$ is output to the output port of the inverter that is a part of b(x), and $o_3$ is output to the parent node of the node. If $o_3=i_3$, and only if $i_3=1$, $o_2=i_2$, that is to say, if the output from the child node of the node is 1, the output of the inverter at the node is the input $i_2$ of the NXOR logic gate.

Here is an example with n=4, by which the work process of the inverter according to the present invention is illustrated.

Firstly, as shown in FIG. 4, to find out which path represents the finite field element a(x) to be inversed.

Suppose the to-be-inversed element a(x)=x, which can be expressed as $(0010)_2$ in binary. Because $a_{n-1}=n_1=1$, the $n_1$ node is in the correct path, the AND logic gate outputs 1 to the left and right child nodes. In the $n_2$ node, because $i_1=0$, $i_2=0$, $i_0=1$, the AND logic gate outputs 1 to the left and right child nodes, that means, the $n_2$ node is also in the correct path. It can be obtained by the same way that the $n_3$ node and the $n_4$ node are all in the correct path, so the path from $n_1$ to $n_4$ represents $(0010)_2$, namely, a(x). Because the $n_4$ node is connected with the $n_5$ node, the output of the AND logic gate of the $n_4$ node is transmitted to the $n_5$ node. That is to say, the inverse of a(x) is in the finite field.

Figure 5:
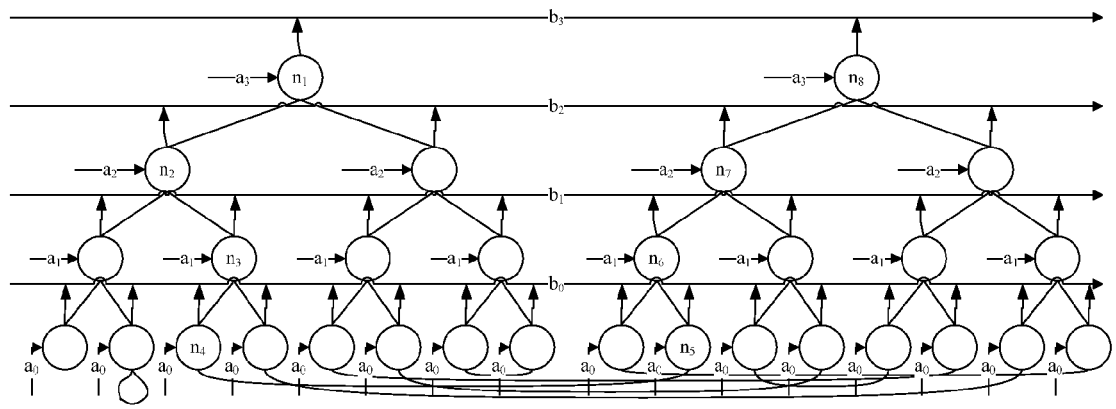
FIG. 5 is a structure schematic diagram of a search tree inverse circuit for searching the inverse of a finite field element according to an embodiment of the present invention.

Secondly, as shown in FIG. 5, to find out which path represents the inverse b(x) of the finite field element a(x) to be inversed.

Because the $n_4$ node is connected with the $n_5$ node, the output value 1 of the $n_4$ node is transmitted to $n_5$ node. The $n_5$ node can directly transmit the value 1 to its parent node $n_6$ and its ancestor nodes $n_7$ and $n_8$. Meanwhile, $n_5$ node, $n_6$ node, $n_7$ node and $n_8$ node output the internal data (namely the input $i_2$ of the NXOR logic gate) to the output port, namely said internal data is b(x). Therefore, b(x) is the inverse of a(x).

The above examples are preferred embodiments of the present invention, but the present invention is not limited to said embodiments; any modification, replacement, combination and simplification may be made to the embodiments without departing from the scope of the invention.

What is claimed is:

1. A finite field inverter, comprising:
   an input port, configured to input an operand a(x);
   a search tree inverse circuit, configured to perform an inverse operation of the operand a(x) in the finite field $GF(2^n)$ based on a search tree structure;
   an output port, configured to output an inversion result b(x) of the operand a(x);
   wherein the search tree inverse circuit is provided with a left search tree and a right search tree; the left search tree and the right search tree each comprises tree nodes for processing inverse operations over the finite field $GF(2^n)$ and connecting wires connected between the tree nodes, the tree nodes comprise a root node, internal nodes and leaf nodes, each path from the root node to a leaf node represents an element in the finite field $GF(2^n)$; and the connecting wires between the tree nodes connect the path representing the operand a(x) with the path representing the inversion result b(x).

2. The finite field inverter of claim 1, wherein in the search tree inverse circuit, the operand a(x) is represented by a path from the root node to a leaf node $n_1$, the inversion result b(x) is represented by a path from the root node to a leaf node $n_2$, and the connecting wire is provided between the leaf node $n_1$ and the leaf node $n_2$.

3. The finite field inverter of claim 2, wherein the tree nodes of the search tree inverse circuit are achieved by logic gate circuit.

4. The finite field inverter of claim 3, wherein in the search tree inverse circuit, the tree nodes comprises a NXOR logic gate, a AND logic gate and a data selector MUX; one input of the NXOR logic gate is the bit value of the operand a(x), and the other input of the NXOR logic gate is $i_2$; one input of the AND logic gate is $i_0$, and the other input of the AND logic gate is the output of the NXOR logic gate; the data selector MUX is provided with a data input $i_2$, a strobe input $i_3$ from its child node, an inverse output $o_2$ and an output $o_3$ transmitted to its parent node; if the tree node is a root node, $i_0$ is 1; if the tree node is an internal node or a leaf node, and at the same time the tree node is a left child node, $i_2=0$; if the tree node is an internal node or a leaf node, and at the same time the tree node is a right child node, $i_2=1$; if the tree node is a root node or an internal node, the AND logic gate outputs the result of Boolean AND operator to its child node; if the tree node is a leaf node, the AND logic gate outputs the result of Boolean AND operator to a leaf node connected to said tree node; and for the root node of the left search tree, $i_2=0$, while for the root node of the right search tree, $i_2=1$.

5. The finite field inverter of claim 1, wherein each of the root nodes and the internal nodes has a left child node and a right child node, the value of the left child node is 0, while the value of the right node is 1.

6. The finite field inverter of claim 1, wherein the operand a(x) and the inversion result b(x) have the following forms:

$$a(x)=a_{n-1}x^{n-1}+a_{n-2}x^{n-2}+\ldots+a_0;$$
$$b(x)=b_{n-1}x^{n-1}+b_{n-2}x^{n-2}+\ldots+b_0.$$

* * * * *